United States Patent Office 2,739,910
Patented Mar. 27, 1956

2,739,910
METHOD OF IMPROVING THE SCRUB RESISTANCE OF POLYVINYL ACETATE COATING COMPOSITIONS

Alan R. McGarvey, Lancaster Township, Lancaster County, Pa., assignor to Armstrong Cork Company, Lancaster, Pa., a corporation of Pennsylvania No Drawing. Application December 1, 1953,
Serial No. 395,623

3 Claims. (Cl. 117—161)

This invention relates to a method of improving the scrub resistance of polyvinyl acetate coating compositions. The term "scrub resistance" is used to connote a physical property of a dried and hardened coating composition related to its water resistance and washability, usually measured in the laboratory by subjecting the coating to repeated rubbing with a wet brush in a Gardiner Straight Line Washability Machine.

It has been discovered that an unexpected improvement in scrubability of an polyvinyl acetate coating composition is obtained if the polyvinyl acetate is formed into a dispersion, with a water solution of sodium methyl siliconate as the continuous phase, and a layer of the coating composition is applied to a surface to be treated and is then dried to deposit the polyvinyl acetate material, intimately protected by the sodium methyl siliconate.

Silicone resins are commercially used in coating compositions, but they do not improve scrub resistance to the marked extent that practice of the method of this invention does. It is believed that there may be some chemical reaction between the sodium methyl siliconate and the extremely small particles of polyvinyl acetate which are in intimate contact with the sodium methyl siliconate. Regardless of this theory, however, it is possible to establish that the scrub resistance of a coating produced in accordance with the present invention is far superior to the same polyvinyl acetate coating composition, except with the sodium methyl siliconate applied as a separate coating to the surface of the polyvinyl acetate coating. It would normally be assumed that if sodium methyl siliconate offers an improvement in scrubability, it would be most effective if applied to the exposed upper surface of the polyvinyl acetate coating composition where it would present a concentrated siliconate layer. There is an improvement over an untreated polyvinyl acetate coating composition, but it is far less than the improvement obtained by practice of the present invention.

Polyvinyl acetate coating compositions are in commercial use, and the present invention is applicable to them as a class, provided they are sufficiently finely divided, as by emulsion polymerization of the resin, to present an enormous surface area for the reception of the deposited sodium methyl siliconate. If the particles have a maximum average size of 3 microns they will be acceptable.

The following is an example of a coating composition which may be prepared in accordance with the method of this invention.

*Composition No. 1*

Parts by weight
(a) Water dispersion of polyvinyl acetate molecular weight about 1,100,000 (55% solids)__ 1491.1
(b) Plasticizer _____ 441.4
(c) Filler and pigments _____ 1135.9
(d) Sodium nitrite _____ 7.5
(e) Dispersing agent _____ 6.8
(f) Sodium methyl siliconate (20% solids) __ 32.5
(g) Water _____ 544.4±16.7

In the above example the polyvinyl acetate component (a) may have a viscosity of 0.2036 poise at 25° C., based on a 0.25 gram specimen in a 100 cc. solution with m-cresol as a solvent. The size of the particles in the dispersion will be about 1.0 to 3.0 microns. This product is sold by E. I. du Pont de Nemours & Co. as Elvacet 81–900.

In the preparation of the composition, the dispersing agent is dissolved in 327.4 parts of the water, with the rust inhibiting sodium nitrite. The filler and pigments are then added. To this pastelike mass is added the polyvinyl acetate dispersion, the sodium methyl siliconate, and the plasticizer. Since the sodium methyl siliconate is water-soluble, its water solution (together with any other water-soluble materials such as the sodium nitrite and the dispersing agent) constitutes the continuous phase of the dispersion in which the polyvinyl acetate particles constitute a major component of the dispersed phase. After intimate mixing to secure essentially complete dispersion, the remaining water necessary to produce a composition of the desired viscosity (217.0±16.7 parts) is added with further stirring.

The composition thus prepared may be applied to any surface to be treated, such as the outer surface of an insulated wall, the surface of an exposed insulated storage tank, or elsewhere, and the coating dried by evaporation of water from the composition.

A dried coating prepared in accordance with the above example, when tested in a standard Gardiner straight line washability machine after an ambient drying time of one month, showed improvement over (a) the same coating without sodium methyl siliconate and (b) the same coating but with the sodium methyl siliconate applied as a surface film over the dried polyvinyl acetate coating composition of (a), as indicated in the following table:

Number of strokes
to destroy coating
(a) Polyvinyl acetate coating composition_____ 3,000
(b) Same as (a) but with applied layer of sodium methyl siliconate deposited from 20% solution of the siliconate in water _____ 9,000
(c) Coating in accordance with the present invention—Composition No. 1 above_____ 18,000

The ambient drying time in all instances was one month.

Coating compositions of the type disclosed in the copending application of Collins E. Bushnell, Serial No. 318,341, filed November 1, 1952, now Patent No. 2,720,496 and entitled "Composition of Matter" may be employed in the practice of the method of this invention.

I claim:

1. A method of improving the scrub resistance of dried polyvinyl acetate coatings comprising forming a dispersion of (a) polyvinyl acetate in which the particles of polyvinyl acetate have a maximum average particle size of 3 microns in (b) a water solution of sodium methyl siliconate which constitutes the continuous phase of said dispersion, applying a film of said solution to a surface, and drying the film to remove water therefrom and to deposit on said surface said polyvinyl acetate material intimately protected by said sodium methyl siliconate.

2. A method of making an improved surface-coated article, the steps comprising applying to a surface a composition comprising a dispersion of (a) polyvinyl acetate in which the particles of polyvinyl acetate have a maximum average particle size of 3 microns in (b) a water solution of sodium methyl siliconate which constitutes the continuous phase of said dispersion and drying the composition to remove water therefrom and to deposit an intimate coating of sodium methyl siliconate onto said polyvinyl acetate particles throughout the extent of said dried composition.

3. A method of protecting an insulating material, the steps comprising applying to the surface of a body of insulating material a layer of composition comprising a dispersion of (a) polyvinyl acetate in which the particles of polyvinyl acetate have a maximum average particle size of 3 microns in (b) a water solution of sodium methyl siliconate which constitutes the continuous phase of said dispersion and removing water from said composition and thereby depositing an intimate coating of sodium methyl siliconate onto said polyvinyl acetate particles throughout the extent of said dried composition.

References Cited in the file of this patent

UNITED STATES PATENTS

| | | |
|---|---|---|
| 2,587,636 | MacMullen | Mar. 4, 1952 |
| 2,601,315 | Morrison | June 24, 1952 |
| 2,650,170 | Kimball | Aug. 25, 1953 |
| 2,673,824 | Biefeld | Mar. 30, 1954 |